United States Patent [19]

Scharnhorst

[11] Patent Number: 5,355,307
[45] Date of Patent: Oct. 11, 1994

[54] APPARATUS FOR ENTERING AND DISPLAYING CONTROL COMMANDS FOR CONTROLLING A MACHINE LOOP

[75] Inventor: Joachim Scharnhorst, Garbsen, Fed. Rep. of Germany

[73] Assignee: Grundig AG, Furth, Fed. Rep. of Germany

[21] Appl. No.: 24,486

[22] Filed: Mar. 1, 1993

[30] Foreign Application Priority Data

Mar. 2, 1992 [EP] European Pat. Off. ........ 92103580.4

[51] Int. Cl.$^5$ .................. G05B 19/04; G06F 15/46
[52] U.S. Cl. .................. 364/188; 364/474.22; 364/474.23; 364/474.27
[58] Field of Search .................. 364/188–193, 364/146, 474.22–474.27, 709.01, 709.16; 340/706–712; 395/118, 130–132, 144–161

[56] References Cited

U.S. PATENT DOCUMENTS

| 4,823,253 | 4/1989 | Shima et al. | 364/188 |
| 4,926,311 | 5/1990 | Matsumura et al. | 364/191 |
| 5,008,847 | 4/1991 | Lapeyre | 364/709.16 |
| 5,050,116 | 9/1991 | Stahnke | 364/709.15 |

FOREIGN PATENT DOCUMENTS

| 0034506 | 8/1981 | European Pat. Off. . |
| 0101211 | 2/1984 | European Pat. Off. . |
| 0044192 | 5/1987 | European Pat. Off. . |
| 3245610 | 8/1983 | Fed. Rep. of Germany . |
| 3837759 | 5/1990 | Fed. Rep. of Germany . |
| 2153122 | 8/1985 | United Kingdom . |
| 2212301 | 7/1989 | United Kingdom . |

OTHER PUBLICATIONS

*DSWINDOWS* User Guide, Issue 1, Jan. 1992, p. 42.
*Typing Instructor Version 2.13* (screen printout), Individual Softward, Inc. date unknown.

*Primary Examiner*—Jerry Smith
*Assistant Examiner*—Jim Trammell
*Attorney, Agent, or Firm*—Scully, Scott, Murphy & Presser

[57] ABSTRACT

A control apparatus, in particular for a machine tool, has an input keyboard, for the input of items of data and/or control commands, has further a visual display unit with a screen, and has an operation unit. Items of control information can be displayed on the screen in the form of a menu and a sub-menu. A key image is placed before each item of control information, which image comprises several fields of which one field is made optically distinguishable from the other fields. The keyboard has selected keys which are arranged similarly to the fields of the key image. The key images serve for menu guidance, the operator, when selecting a command term, having to press that key which corresponds to the optically distinguishable field of the associated key image.

7 Claims, 2 Drawing Sheets

APPARATUS FOR ENTERING AND DISPLAYING CONTROL COMMANDS FOR CONTROLLING A MACHINE LOOP

TECHNICAL FIELD OF THE INVENTION

The invention relates to a control apparatus, in particular for a machine tool.

1. Background of the Invention and Prior Art

In a known control apparatus of the above-mentioned kind (EP-0 101 211A1) the screen image is divided into nine fields, which are arranged in a 3×3 matrix. The nine fields correspond to nine keys on the keyboard, which are arranged similarly as a 3×3 matrix and are intended for the input of the numbers one to nine and for the input of commands. Each of the nine keys is assigned to one of the nine fields, in accordance with position in the matrix. Each field is provided with a corresponding legend for commands. By pressing the assigned key, the command can be activated and the field "determined". The content of the field, i.e. the legend can be magnified over the entire screen or, alternatively, the arrangement of all fields is reduced in scale by a particular amount, including the legends, so that the field arrangement no longer takes up the whole screen. The field arrangement practically forms a key image, which however always appears simply—either magnified or reduced—on the screen. The known control unit has the advantage that it makes do with very few keys. However, it has the disadvantage that for command chains with many hierarchical levels, preceding levels are in each case no longer perceptible.

2. Object of the Invention

The object of the invention is to employ the key image and the assignment of the fields of the key image to corresponding keys of the input keyboard in improved and extended form for the guidance of the user of the control apparatus, in particular for menu guidance.

3. Summary of the Invention

According to the present invention there is provided control apparatus, in particular for a machine tool, having an input keyboard for the input of data items and/or control commands, a visual display unit with a screen, and an operation unit which is connected with the screen and the input keyboard, the operation unit being so configured that fields can be displayed on the screen which are arranged similarly to a corresponding number of selected keys of the input keyboard, thus forming a key image, and further so that an item of control information can be displayed on the screen in association with each field, a control command corresponding to the control information being activated when the key of the input keyboard corresponding to the relevant field is operated, wherein the operation unit is further so configured that each item of control information displayed on the screen, or selected displayed items of control information, is assigned a separate key image, the field of the key image assigned to the item of control information being made optically distinguishable from the other fields of the key image.

An embodiment of the invention makes possible a particularly simple and clear menu guidance. With an embodiment of the invention it is possible not only, as is per se known, to show simultaneously on the screen the control information (main commands) for a main menu and the control information (sub-commands) of a corresponding sub-menu called up upon activation of a main command, but it can also be shown in this way which main command the sub-menu is associated with, which key should be pressed to activate the main command, and which key should be pressed for one of several sub-commands to be activated.

The key image can—as is known per se—be quadratic, with nine closely neighboring fields forming a 3×3 matrix.

Because the fields of the key image—in contrast to the state of the art—need contain no legends or symbols it is possible to make the key image particularly small and space saving. It should be so dimensioned that its height or width is smaller than the line or column spacing of the control information.

The field made optically distinguishable in the key image may be lighter or darker than, or of different colour from the other fields of the key image.

Preferably, the key image in placed before the associated control information. The key images can then be arranged column-like one below another or row-like one after the other.

Expediently, the selected keys of the input keyboard should be—as is known per se—useable both for the input of items of data and for the input of control commands. For the input of items of data, it is known to occupy the 3×3 key matrix of the keyboard so that the numbers one to nine are successively arranged in order from bottom left to top right. Following from this, a development of the invention can be provided in that for successive items of control information the fields are made distinguishable one after another from bottom left to top right.

BRIEF DESCRIPTION OF THE DRAWINGS

An exemplary embodiment of the invention will be described below with reference to the drawings, which show.

DETAILED DESCRIPTION OF PREFERRED EMBODIMENT ACCORDING TO THE INVENTION

Figure 1:
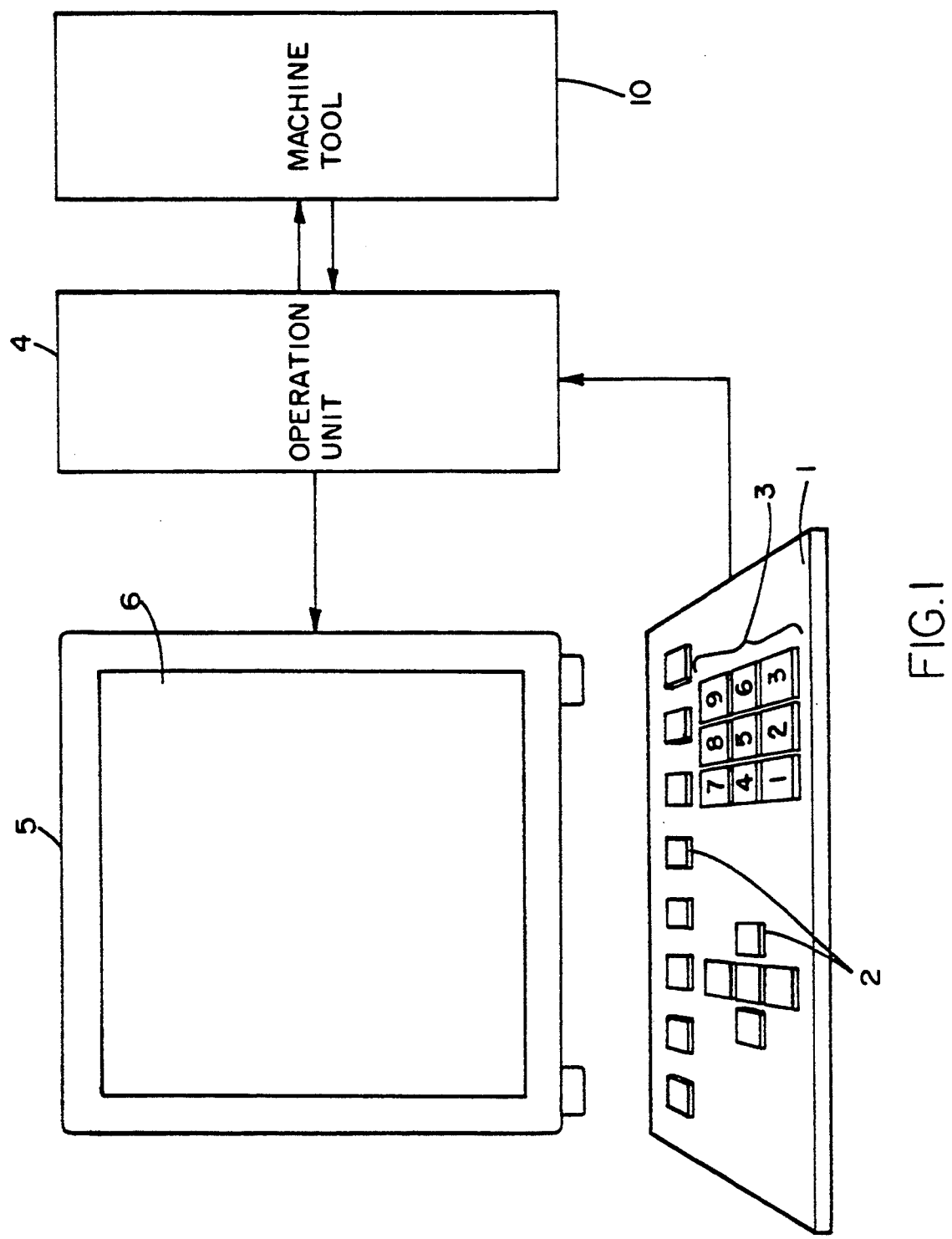
FIG. 1 a schematic block circuit diagram of the control apparatus for a machine tool, FIG. 2 a menu representation on the screen.

In FIG. 1 an input keyboard 1 is provided with keys 2 and 3. Nine keys 3 are arranged in a 3×3 matrix and are occupied by the numbers one to nine for key input. The number one is assigned to the bottom left key and the number nine to the top right key.

Items of data input via input keyboard 1 are directed to an operation unit 4. This is so designed that it controls the machine tool 10 in accordance with the input items of data and the work program stored in the unit. Further, the operation unit 4 is provided with a visual display unit 5 having a screen 6. A menu can be displayed on the screen 6, which guides the operator of the control apparatus.

Figure 2:
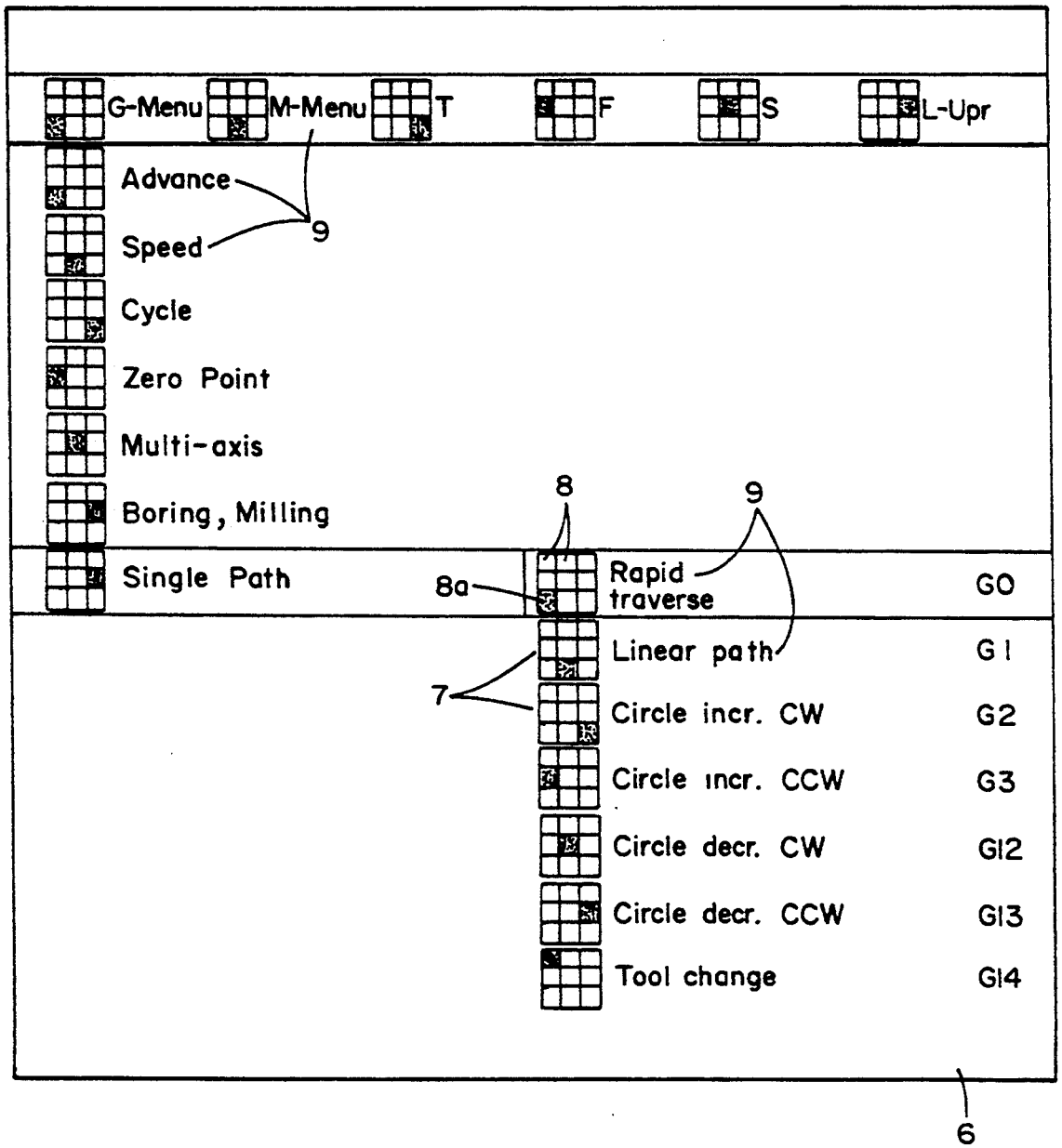

A menu representation which can appear on the screen 6 is shown in FIG. 2. One perceives that a key image 7 in the form of a pictogram is placed in front of each item of menu information 9. In analogy with the 3×3 key matrix on the input keyboard 1, each key image has nine fields 8, of which one 8a is in each case made distinguishable in that it is darker than the other fields 8.

The operator of the control apparatus can now select one main command from the displayed main menu, for example "single path". To this end, he must press the key (middle right) on the input keyboard to which the number six is assigned. When this key is pressed, the machine tool is prepared for the "single path" operation and on the screen 6 the corresponding sub-menu (PULL-DOWN menu) is displayed. From this, the operator can for example select and set in action the sub-command "rapid traverse" by now pressing that key on the input keyboard 1 to which the number one is assigned (bottom left).

As can be understood from FIG. 2, the key images 7 are quadratic. Their fields 8 are, like the keys 3, arranged closely adjacently. The height of the key images 7 is less than the line spacing of the control information 9.

Because the key images 7 are arranged in lines one under the other and in front of the associated control information item, a particularly clear menu arrangement is assured.

What is claimed is:

1. An apparatus for entering and displaying control commands for controlling a machine tool, said apparatus comprising:
   (a) an input keyboard having keys for entering information in the form of data and control commands;
   (b) a visual display means having a display screen for displaying one or more key images, each said displayed key image comprising a plurality of fields which are arranged in a one-to-one correspondence with a corresponding number of selected keys of said input keyboard; and,
   (c) an operation unit for controlling said machine tool and connected with said input keyboard for entering said data and control commands therein and further connected with said visual display means, said operation unit including means for simultaneously displaying on said display screen items of control information in the form of a main menu having one or more main commands and a sub-menu having one or more sub-commands, said sub-menu being displayed upon operator selection of a main command, each said main command and sub-command having a separately assigned key image displayed therewith and further associated with a field of its respective assigned key image, said operation unit including means for causing said field of the respective assigned key image to be optically distinguishable from the other fields of said assigned key image, said operation unit further including means for activating a control command for said machine tool when a key of the input keyboard corresponding to a field of a key image corresponding to a main command or sub-command is selected by said operator.

2. The control apparatus according to claim 1, wherein said items of control information are displayed on said screen one above the other in a column-like fashion with said separately assigned key image being displayed on said screen in a position before its associated item of control information.

3. The control apparatus according to claim 1, wherein said items of control information are displayed on said screen one after the other in a row-like fashion with said separately assigned key image being displayed on said screen in a position before its associated item of control information.

4. Control apparatus according to claim 1, wherein the key image is quadratic, with nine closely neighbouring fields making up a 3×3 matrix.

5. Control apparatus according to claim 4, wherein for successive items of control information the fields are made optically distinguishable, one after the other, from bottom left to top right.

6. The control apparatus according to claim 8, wherein said display screen comprises a plurality of column and line spaces for accommodating said displayed items of control information, said apparatus characterized in that said displayed key image is of a height that is less than the line spacing of said display screen and is of a width less than the column spacing of said display screen.

7. Control apparatus according to claim 1, wherein the field of the key image made optically distinguishable is lighter or darker than, or of different color from, the remaining fields of the key image.

* * * * *

UNITED STATES PATENT AND TRADEMARK OFFICE
CERTIFICATE OF CORRECTION

PATENT NO. : 5,355,307
DATED : October 11, 1994
INVENTOR(S) : Joachim Scharnhorst It is certified that error appears in the above-indentified patent and that said Letters Patent is hereby corrected as shown below:

On the title page: Item [54] and Col. 1, line 3, "LOOP" should read --TOOL--

Column 1, line 4: "LOOP" should read --TOOL--

Column 4, line 31, Claim 6: "claim 8" should read --claim 1--

Signed and Sealed this

Twenty-fourth Day of October, 1995

Attest:

BRUCE LEHMAN

Attesting Officer

Commissioner of Patents and Trademarks